United States Patent
Haessig, Jr. et al.

(10) Patent No.: US 10,277,320 B1
(45) Date of Patent: Apr. 30, 2019

(54) APPARATUS AND METHOD FOR RAPID IDENTIFICATION OF LASER COMMUNICATION BEACONS

(71) Applicant: BAE Systems Information and Electronic Systems Integration Inc., Nashua, NH (US)

(72) Inventors: David A Haessig, Jr., Towaco, NJ (US); Dennis P Bowler, Sudbury, MA (US); Robert T Carlson, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/968,083

(22) Filed: May 1, 2018

(51) Int. Cl.
   *H04B 10/118* (2013.01)
   *H04B 10/50* (2013.01)

(52) U.S. Cl.
   CPC ......... *H04B 10/118* (2013.01); *H04B 10/503* (2013.01)

(58) Field of Classification Search
   CPC .................... H04B 10/118; H04B 10/503
   See application file for complete search history.

(56) References Cited

U.S. PATENT DOCUMENTS

| | | | | |
|---|---|---|---|---|
| 4,580,016 A * | 4/1986 | Williamson | ............ | H04B 3/46 379/31 |
| 6,701,133 B1 * | 3/2004 | Bennett | ................. | G01V 1/223 370/503 |
| 6,920,287 B1 * | 7/2005 | Hinds | ................ | H04B 10/0771 370/241 |
| 8,295,547 B1 * | 10/2012 | Cangiani | ................. | G01S 17/66 342/357.21 |
| 2006/0142976 A1 * | 6/2006 | Bonanni | ............ | G05B 23/0254 702/189 |

(Continued)

OTHER PUBLICATIONS

Esteban, Segundo, "Signal Conditioning for the Kalman Filter:Application to Satellite Attitude Estimation with Magnetometer and Sun Sensors", Oct. 31, 2016, MDPI, All pages.*

(Continued)

*Primary Examiner* — David C Payne
*Assistant Examiner* — Pranesh K Barua
(74) *Attorney, Agent, or Firm* — Maine Cernota & Rardin (57) ABSTRACT

A disclosed apparatus and method verify whether a hot spot within a scene is a valid laser-com signal, and further identify laser-com signals of interest. An extended Kalman filter (EKF) is applied to a received signal or beacon to detect whether it is modulated according to a square wave or other expected amplitude modulation pattern. Embodiments further determine whether the modulation frequency matches a signal or beacon of interest. In embodiments, a plurality of indexed EKF's are "tuned" to different modulation frequencies, and are used to identify a beacon's modulation frequency index. Where each EKF is required to compute amplitude and phase partial derivatives of the observation vector, the amplitude partials can be calculated according to the expected modulation pattern, and the phase partials can be calculated using a truncated Fourier or step-wise approximation of the expected modulation pattern. Embodiments further assume a time-invariant covariance matrix.

16 Claims, 10 Drawing Sheets

(56) References Cited

U.S. PATENT DOCUMENTS

| | | | | |
|---|---|---|---|---|
| 2007/0280689 | A1* | 12/2007 | Boffi | G02F 1/0136 |
| | | | | 398/65 |
| 2013/0251364 | A1* | 9/2013 | Pachnicke | H04J 14/0227 |
| | | | | 14/227 |
| 2015/0188628 | A1 | 7/2015 | Chalfant, III | |
| 2016/0204866 | A1 | 7/2016 | Boroson | |
| 2016/0211938 | A1* | 7/2016 | Jiang | H04B 10/0775 |
| 2017/0047987 | A1* | 2/2017 | Pellegrino | H03F 3/19 |
| 2017/0078648 | A1* | 3/2017 | Saunders | H04N 13/246 |
| | | | | 13/246 |
| 2017/0134210 | A1* | 5/2017 | Eitan | H04L 27/367 |
| 2018/0351653 | A1 | 12/2018 | Bortz | |

OTHER PUBLICATIONS

"Charles Casey, et al.,""Suitability of free space optical communication in militaryenvironments"" 20th International—Command & Control Research & TechnologySymposium, 2015, 12 p.http://hdl.handle.net/10945/48026".

* cited by examiner

APPARATUS AND METHOD FOR RAPID IDENTIFICATION OF LASER COMMUNICATION BEACONS

FIELD OF THE DISCLOSURE

The invention relates to wireless telecommunications, and more particularly, to wireless laser communications.

BACKGROUND

Due to an explosion in both civilian and military wireless communication, there is a growing need for high speed, reliable, secure, wireless communication of large amounts of data between communicating nodes. It should be noted that the term "wireless" is used throughout this disclosure to refer to any communication that does not depend on a physical link between sender and receiver. Hence, the term "wireless" as used herein excludes fiber optic communication as well as communication over copper wires.

Traditional communication by wireless radio frequencies suffers from several shortcomings, many of which arise from the wide geographic dispersion of typical radio emissions. Even when directional antennae and antenna arrays are used, radio signals are generally disbursed over large geographic areas, causing rapid attenuation of the signal strengths with distance, and also causing the signals to be relatively easy to intercept by unintended receivers. Due to the geographic overlap of radio communication signals, it is typically necessary to assign radio transmissions to specific frequency bands, which are often in limited supply. Furthermore, it is relatively easy for hostile antagonists to attempt to jam radio communications by transmitting radio signals at high energies that blanket a region of interest.

There are several approaches that attempt to address these problems of wireless radio communications. For example, bandwidth restrictions can be mitigated by opportunistically seeking and using bands that are nominally assigned to other uses, but are not currently in use. Various time and coding schemes can be employed to allow more than one communication link to share the same frequency band. And so-called "multi-user" detection can be employed to further distinguish signals transmitted on overlapping frequencies.

The geographic range of wireless signals can be extended by implementing signal relay nodes within a region of interest.

Security of wireless radio communications can be improved, for example, by employing secure transmission methods such as frequency "hopping," by adding pseudo-noise to communications, and by encoding communications with sophisticated, virtually impregnable cyphers. The Link 16 protocol is an example of this approach.

Nevertheless, all of these approaches to radio communication include significant disadvantages, such as increased cost and complexity, and message processing overhead that can slow communication and limit data transfer speeds.

Laser communication, or "laser-com," offers an attractive wireless alternative to radio communication, especially when point-to-point communication is required, because the non-dispersed, focused character of laser communication intrinsically avoids most of the problems that are associated with radio communication. In particular, there is no need to assign frequency bands to laser-com users, because interference between laser signal beams is avoided so long as two beams are not directed to the same recipient. Laser signals experience very little attenuation as a function of distance, because the signal energy remains tightly focused in a beam. And communication security is intrinsically high, because interception of and interference with laser communications requires direct interception of a laser communication beam, and/or focusing jamming beams directly at an intended signal receiver.

One important application that can benefit significantly from laser-com is satellite communications, where line-of-sight access is generally available, and where the communication distances are very great. Laser-com can provide communication data rates for satellites that are much higher than radio data rates, with unmatched anti-jam characteristics and an inherently low risk of communications intercept. Laser-com also eliminates the need for frequency planning and authorization, and circumvents the highly congested RF spectrum bandwidth constraints that limit the practical data rates available to users of RF links.

Figure 1:
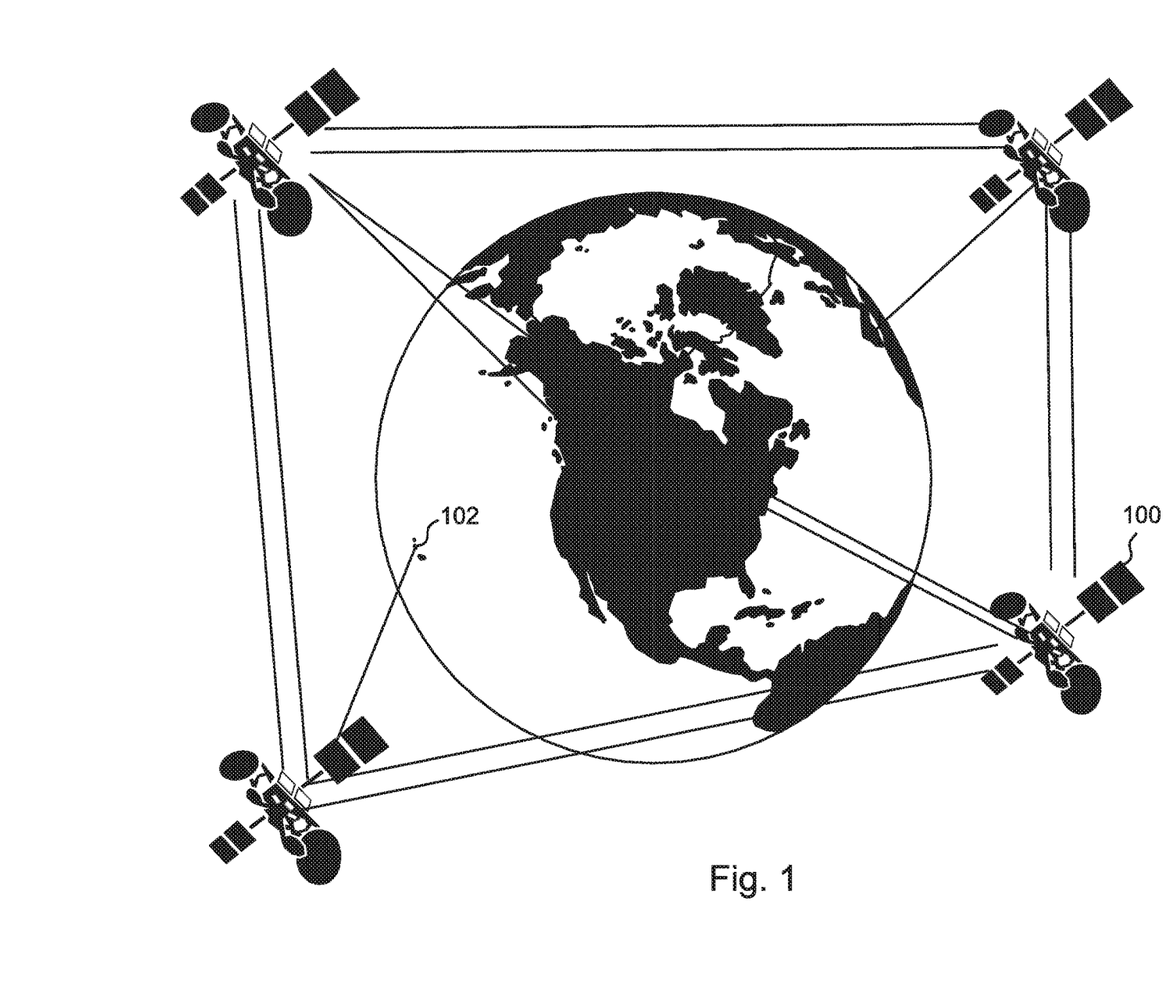
FIG. 1 illustrates laser-com communication between orbiting satellites, and between the satellites and ground-based nodes.

With reference to FIG. 1, laser communications holds great promise for multi-Gbps (Giga-bits per second) connections between space platforms 100, as well as between ground-based nodes 102 and space platforms 100, owing to the availability of efficient, multi-watt laser sources and exceedingly high antenna gain, having beam widths of only 10-20 micro-radians and telescope apertures that are only four to eight inches in diameter. And even when much lower data rates of tens to hundreds of mega-bits per second (Mbps) are of interest, laser-com may be desirable due to its Low Probability of Intercept (LPI), Low Probability of Detection (LPD) and anti-jam communications link security.

It should be noted that the disclosure herein is mainly presented with reference to satellite communication. However, it will be understood by those of skill in the art that the present disclosure is not limited to satellite communication, but also applies to other implementations of laser communication.

Of course, there are certain problems associated with laser communication that arise specifically from the focused nature of laser beams. In particular, it is necessary for communicating nodes to identify each other and align their lasers so as to effectively communicate. In the case of satellite laser-com, these identification and alignment problems are especially acute, because laser sources that are well separated by terrestrial standards, for example several miles apart from each other, may nevertheless appear to be almost geographically overlapping from the viewpoint of a satellite. Furthermore, thermal and other effects of the atmosphere can lead to both frequency (wave length) and angular (apparent location) shifting of an incident laser communication beam, even after it is identified and aligned. The angular vibrational effects, together with other short-term mechanical instabilities of the satellite or other receiving node, are referred to herein collectively as "jitter."

Figure 2:
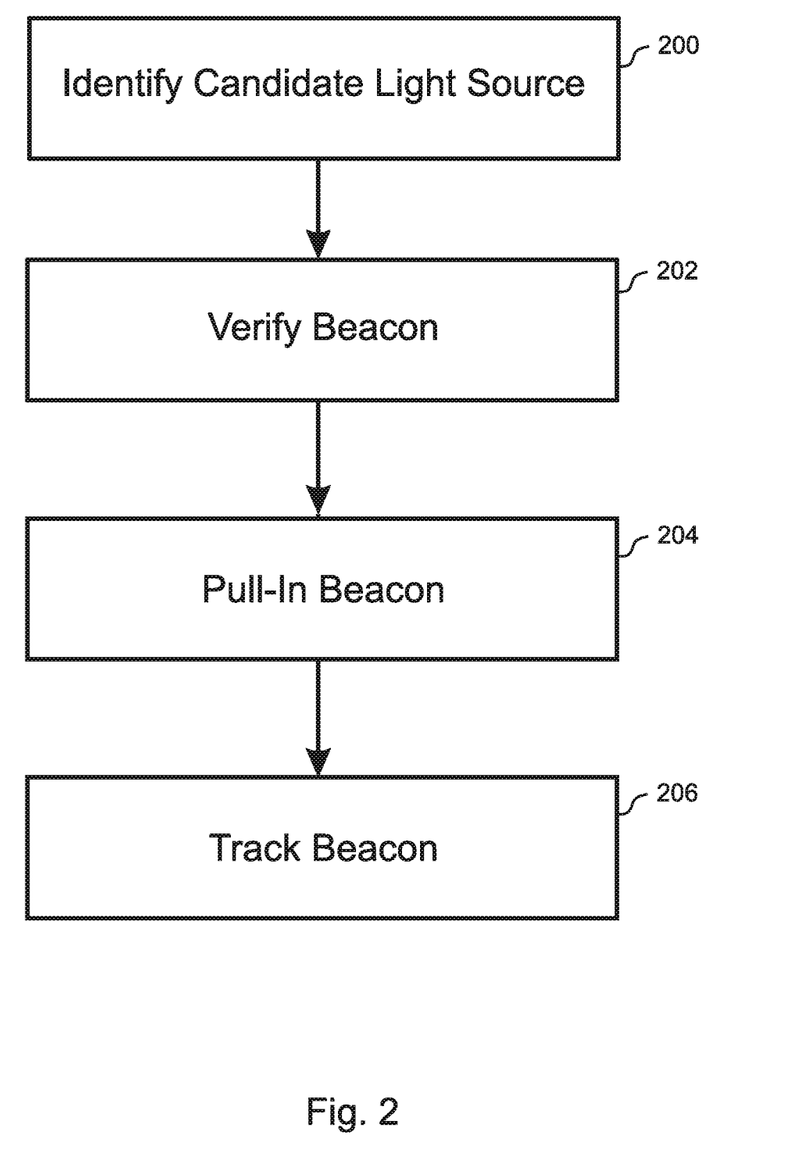
FIG. 2 is a flow diagram illustrating steps required for aligning a laser-com receiving system with a transmitting node.

With reference to FIG. 2, there are at least four steps that must be accomplished so as to establish and maintain laser communications. First, a candidate light source, referred to herein as a "hot spot," must be identified from within a scene of interest 200. Second, the hot spot must be verified as being a communication signal, and its transmission source must be identified so as to determine if it is a signal of interest 202. Third, the optics of the laser-com receiving system must be aligned with the incoming beam 204, and finally, once communication has been established, the beam must be tracked during communication so that the alignment is maintained and the communication is not interrupted 206.

The present disclosure is directed to the second 202 of the steps of FIG. 2, wherein there is a need for a more rapid and reliable apparatus and method for verifying whether a candidate laser communication ("laser-com") signal that has been identified as a "hot spot" within a scene of interest is a valid laser-com signal, and whether the identified signal is a laser-com signal of interest.

SUMMARY

A rapid and reliable apparatus and method are disclosed for verifying whether a candidate laser communication ("laser-com") signal that has been identified as a "hot spot" within a scene of interest is a valid laser-com signal, and whether the identified signal is a laser-com signal of interest.

In embodiments, the laser-com signal of interest comprises two overlapping, co-linear beam components that are transmitted at different wavelengths, whereby communicated data is encoded on one of the two beam components, while the other beam component is a "beacon" that is used to identify the laser-com signal to the satellite or other laser signal receiving node. So as to enable the beacon of interest to be identified and distinguished from other light sources and from other beacons, the beacon of interest is modulated in amplitude according to an identifying modulation pattern, which in embodiments is a square wave amplitude modulation having a specified square wave modulation frequency.

According to the disclosed method, an extended Kalman filter (EKF) is applied to a measured observation y(x,t), so as to rapidly detect whether the beacon component of the candidate signal is modulated according to a square wave modulation frequency or other modulation pattern that corresponds to an observation vector model h(x,t) that is characteristic of a valid laser-com beacon (as compared to some other light source that is not a laser-com beacon), and in embodiments to further determine whether it is a beacon of interest. Embodiments include a plurality of indexed EKF's that are "tuned" to different modulation frequencies, and are used to identify the modulation frequency index of the candidate signal beacon.

In some embodiments, the two overlapping, co-linear beam components of the laser-com signal are spatially separated from each other by the disclosed apparatus, and the beacon component is directed to a sensor that provides the measured observation vector y(x,t) to the extended Kalman filter(s). In some of these embodiments, the sensor is included in a focal plane array. And in some of these embodiments, the focal plane array is used to track the laser-com signal, so as to compensate for jitter.

In embodiments, each extended Kalman filter (EKF) is required to compute partial derivatives with respect to amplitude and phase of the observation vector model h(x,t). In some of these embodiments, the partial derivative of h(x,t) with respect to amplitude is calculated according to the expected square wave or other modulation pattern (i.e. the pattern to which the EKF is "tuned"), while the partial derivative with respect to phase is calculated using an approximation that includes the first few terms of a Fourier expansion of the expected modulation pattern. In some of these embodiments, the Fourier expansion is truncated after four terms.

In various embodiments, the partial derivative of h(x,t) with respect to phase is calculated according to a step-wise approximation of the expected modulation pattern, thereby reducing the number of calculations that are required to apply the EKF to the received signal.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is a rapid and reliable apparatus and method for verifying whether a candidate laser communication ("laser-com") signal that has been identified as a "hot spot" within a scene of interest is a valid laser-com signal, and whether the identified signal is a laser-com signal of interest.

As discussed above with respect to FIG. 2, the first step 200 in establishing laser communication is to review a scene of interest and identify "hot spot" light sources that might potentially be laser-com signals.

Figure 3:
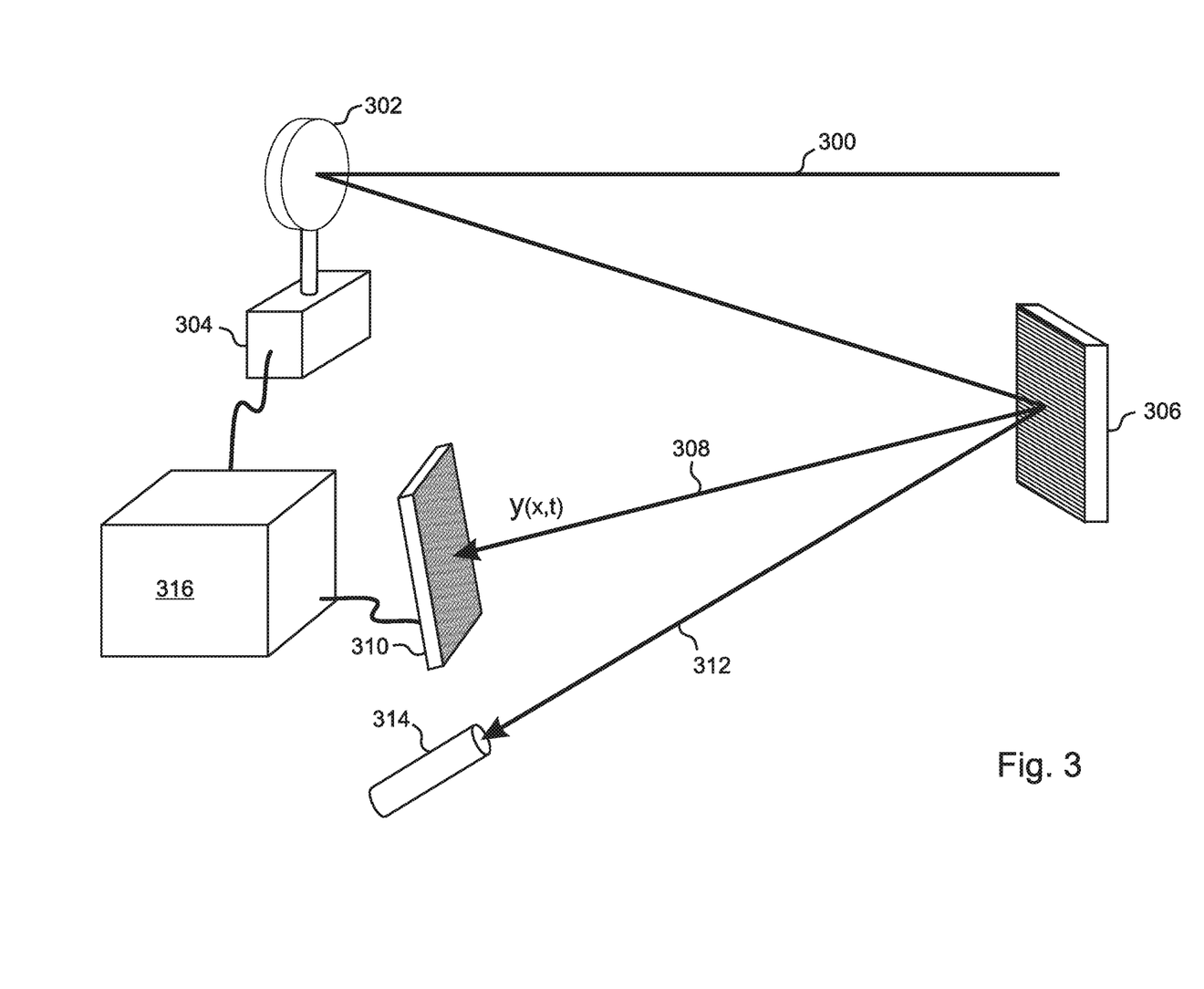
FIG. 3 is a block diagram that illustrates components of a laser-com receiving apparatus according to an embodiment of the present disclosure.

With reference to FIG. 3, in embodiments the laser-com signals 300 comprise two overlapping, co-linear beam components 308, 312 that are transmitted at different wavelengths, whereby one of the two beams is used for data communication 312, and the other of the two beams 308 is a "beacon" that is used to identify the laser-com signal to the satellite 100 or other laser signal receiving node.

In the embodiment of FIG. 3, the incoming light 300 from a scene representing a geographical region of interest is analyzed to detect "hotspots" that are candidate laser-com signals. In one example, when a hotspot is detected the incoming light 300 is directed by a beam directing device, such as a steering mirror 302 controlled by a mirror positioner 304, to a beacon sensor such as a focal plane array 310. According to a further example, when a hotspot is detected, light from the hotspot is directed by the beam directing device 302 onto a beam dividing device 306 that spatially separates the two components 308, 312 from each other. In various embodiments, the beam dividing device 306 can include prisms, beam splitters, gratings, and/or bandwidth filters.

In one example the controller 316 communicates with the mirror positioner 304 by wired or wireless means and determines the positioning of the steering mirror 302. For example, if the hotspot is a laser beacon from a node with which communication is desired, the steering mirror 302 adjusts the direction of the light received from the hotspot such that the signal component 308 is directed onto a laser data receiver or communication receptor 314, such as a fiber optic for receipt of laser communicated data, while, in embodiments, the beacon component 308 is directed to a beacon sensor 310 that is able to convert the incident light at the beacon wavelength into an observation vector y(x,t), which is the sum of a state vector h(x,t) of the system and an observation noise vector v(t). In the embodiment of FIG. 3, the beacon sensor is a focal plane array 310. Once the beacon component 308 is aligned with the beacon sensor 310, the observation vector y(x,t) is processed by the extended Kalman filter, while the steering mirror 302 makes continuous adjustments to compensate for jitter and maintain the beacon component 308 on the beacon sensor 310. Note that, in embodiments, the mirror positioner 304 is able to rotate the steering mirror 302 about two orthogonal axes, although only one rotation axis is shown in FIG. 3 for simplicity of illustration.

Of course, if the candidate signal 300 from the hot spot is not a laser-com signal, then the "beacon component" 308 will not actually be a laser-com beacon, but will simply be the component of the candidate signal 300 that happens to be at the beacon wavelength. According to the disclosed method, the extended Kalman filter (EKF) that is applied to the observation vector y(x,t) rapidly detects whether the beacon component 308 of the candidate signal 300 is modulated according to a square wave modulation or other modulation pattern h(x,t) that is characteristic of a valid laser-com beacon, and in embodiments to further determine whether a valid beacon is a beacon of interest.

Figure 4:
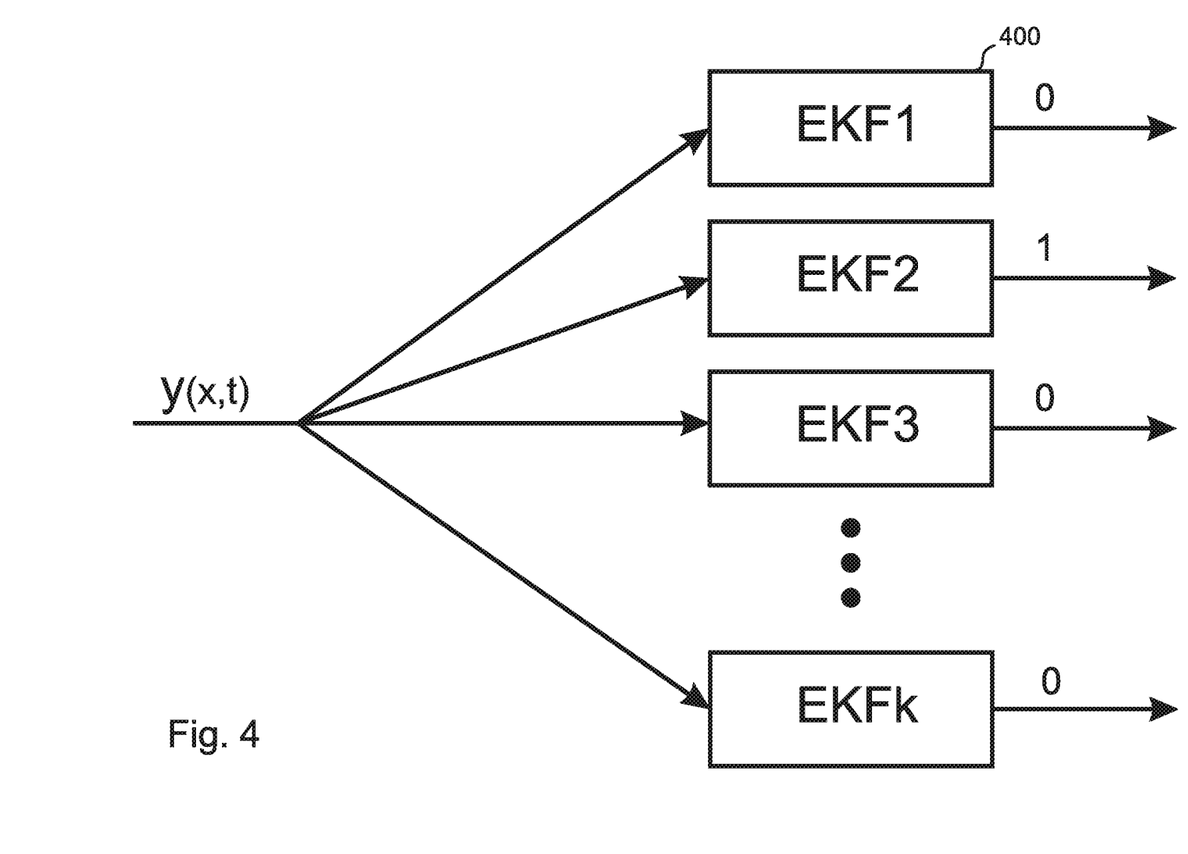
FIG. 4 is a flow diagram that illustrates distribution of a measurement vector to a plurality of extended Kalman filters tuned to a plurality of different modulation frequencies.

With reference to FIG. 4, in embodiments the observed vector y(x,t) is directed to a plurality of indexed EKF's 400 that are "tuned" to different square wave modulation frequencies contained in h(x,t), and are used to identify the modulation frequency index of the candidate signal beacon. In the example shown in the figure, only the second of these EFK filters (EFK2) has detected h(x,t) within the incident y(x,t), indicating that the beacon is modulated at the frequency to which EKF2 is tuned, i.e. to frequency index "2." In general, a valid beacon is deemed to be present when exactly one of the EKF's provides an output that is above a specified threshold. And in some of these embodiments the detected beacon is deemed to identify a signal of interest if the detected frequency index of the beacon matches an index that is known to be used by or assigned to a laser-com source of interest.

In embodiments, the EKF's are derived from the Kalman filter when applied to a general nonlinear system given by $$\dot{x}=f(x,t)+w \quad (1)$$

$$y=h(x,t)+v \quad (2)$$

where x(t) is the state vector, y(x,t) is the observation (or measurement) vector, v(t) and w(t) are the observation and measurement noise vectors, and where f(x,t) and h(x,t) describe the system dynamic state and observation vectors, respectively. The Extended Kalman Filter (EKF) is then given in continuous-time form as:

$$\dot{P}=FP+PF'-PH'V^{-1}HP+W \quad (3)$$

$$K=PH'V^{-1} \quad (4)$$

$$\dot{\hat{x}}=F\hat{x}+K(y-h(\hat{x}-t)) \quad (5)$$

where F and H are the matrices of partial derivatives of f(x,t) and h(x,t) with respect to the vector x; W and V are the process and observation noise spectral density matrices; P is the state covariance matrix; and K is the computed Kalman gain.

Embodiments of the present disclosure apply this approach to the problem of parameter estimation of the square wave or other expected modulation pattern that is characteristic of valid laser-com beacons. In embodiments where the valid beacons are modulated by a square wave having amplitude A and phase φ, h(x,t), as illustrated in FIG. 5 (element 500), can be expressed by:

$$h(x, t) = \frac{A}{2}\text{sign}\{1 - \text{mod}(2\pi ft + \phi, 2\pi)/\pi\} \quad (6)$$

Figure 5:
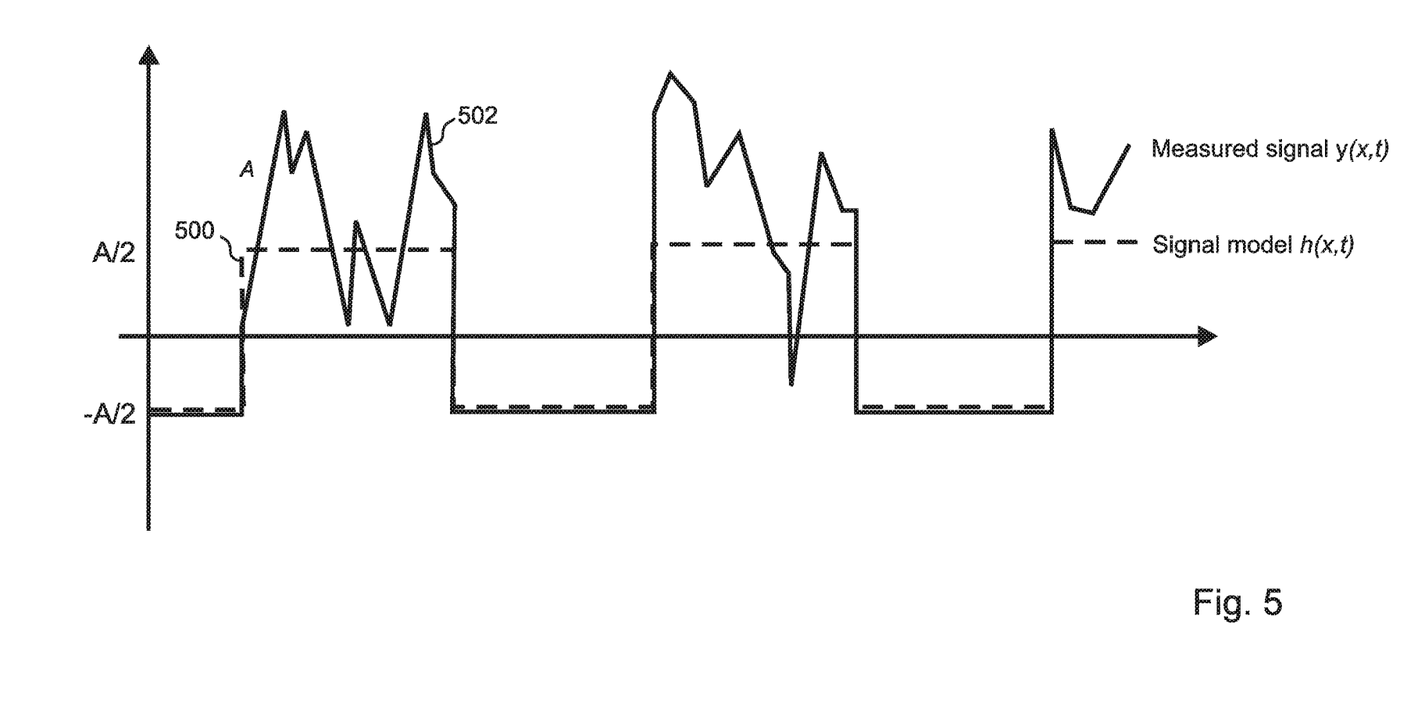
FIG. 5 is a graph that compares a signal amplitude modulation model vector with a measured signal vector.

FIG. 5 compares the modulation vector h(x,t) 500 of eqn. 6 with the measured vector 502 that also includes measurement noise.

Accordingly, the EKF can be applied by formulating the filter such that the unknown states are the amplitude A and phase φ. Since these states are fixed biases, the state dynamics equations are given by:

$$\dot{x}=w \quad (7)$$

$$y=h(x,t)+v \quad (8)$$

where h(x,t) is given by eqn. 6 above.

So as to avoid the infinite partial derivatives with respect to amplitude at the leading and trailing edges of the square wave, h(x,t) can be approximated by a truncated Fourier series. For example, truncating to four terms provides:

$$h(x, t) = \frac{A}{2}\left[\frac{4}{\pi}\left(\sin(2\pi ft + \phi) + \frac{1}{3}\sin(6\pi ft + 3\phi) + \frac{1}{5}\sin(10\pi ft + 5\phi) + \frac{1}{7}\sin(14\pi ft + 7\phi)\right)\right] \quad (9)$$

According to this application, the EKF is given by:

$$F = [0]_{2\times 2} \quad (10)$$

$$H(x, t) = \left[\frac{\partial h}{\partial A} \frac{\partial h}{\partial \phi}\right] =$$

$$\begin{bmatrix} \frac{1}{2}\left[1 + \frac{4}{\pi}\left(\sin(2\pi ft + \phi) + \frac{1}{3}\sin(6\pi ft + 3\phi) + \frac{1}{5}\sin(10\pi ft + 5\phi) + \frac{1}{7}\sin(14\pi ft + 7\phi)\right)\right]' \\ \frac{A}{2}\left[\frac{4}{\pi}(\cos(2\pi ft + \phi) + \cos(6\pi ft + 3\phi) + \cos(10\pi ft + 5\phi) + \cos(14\pi ft + 7\phi))\right] \end{bmatrix}$$

And thus the EKF dynamic equations become:

$$\dot{P}=KHP+W \quad (12)$$

$$K=PH'V^{-1} \quad (13)$$

$$\hat{\dot{x}} = K(y - h(\hat{x}, t)) \quad (14)$$

In embodiments, the approach is simplified by realizing that the partial derivative of h(x,t) with respect to amplitude can be derived directly from eqn. 6 without approximation of h(x,t):

$$\frac{\partial h}{\partial A} = \frac{A}{2}[\text{sign}\{1 - \text{mod}(2\pi ft + \phi, 2\pi)/\pi\}] \quad (15)$$

Figure 6:
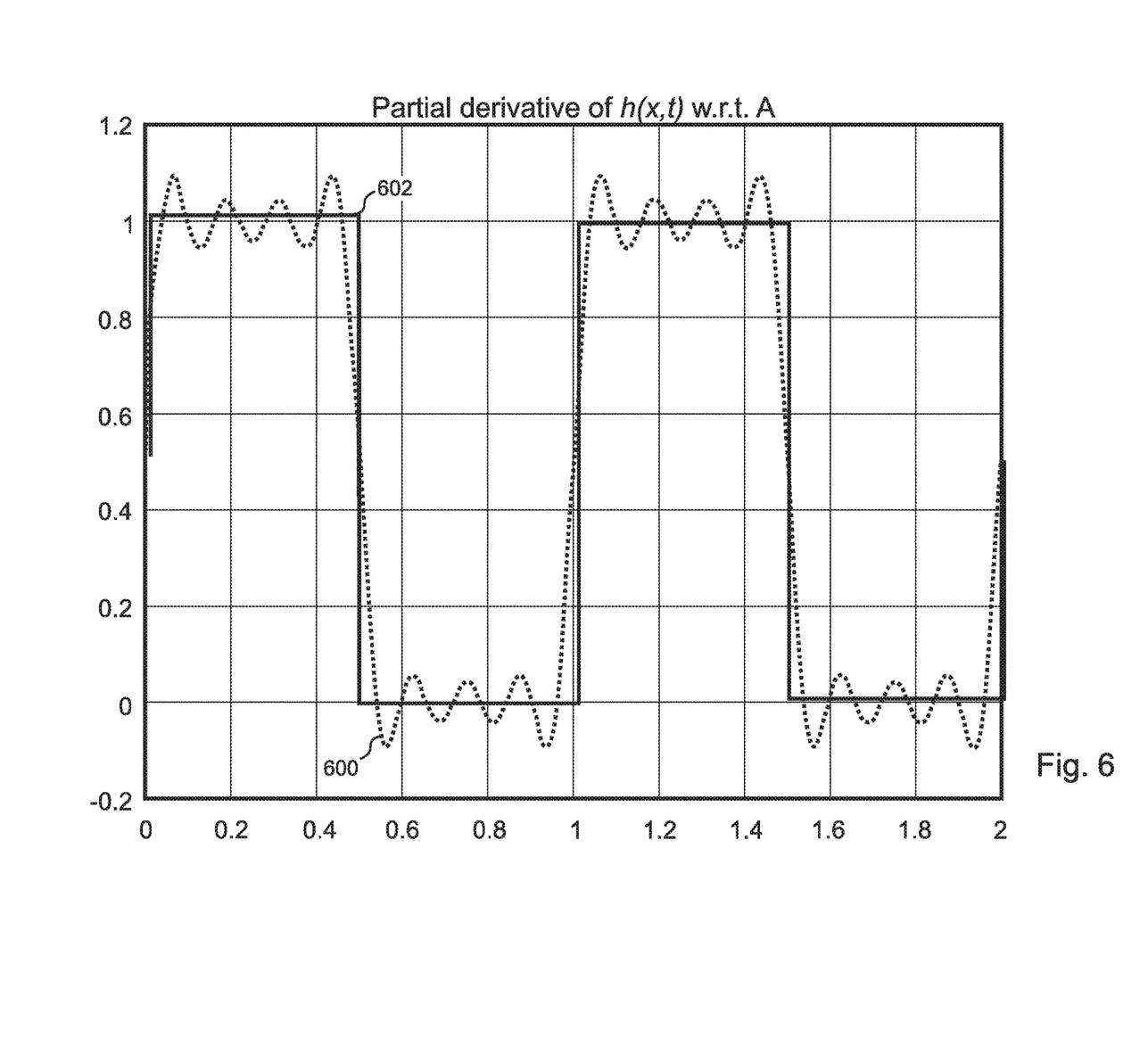
FIG. 6 is a graph that compares an ideal square wave amplitude modulation model with a truncated Fourier model of the model.

This exact calculation 602 of $$\frac{\partial h}{\partial A}$$

is compared in FIG. 6 with the approximate calculation 600 of eqn. 11 that is based on the first four Fourier components.

Figure 7A:
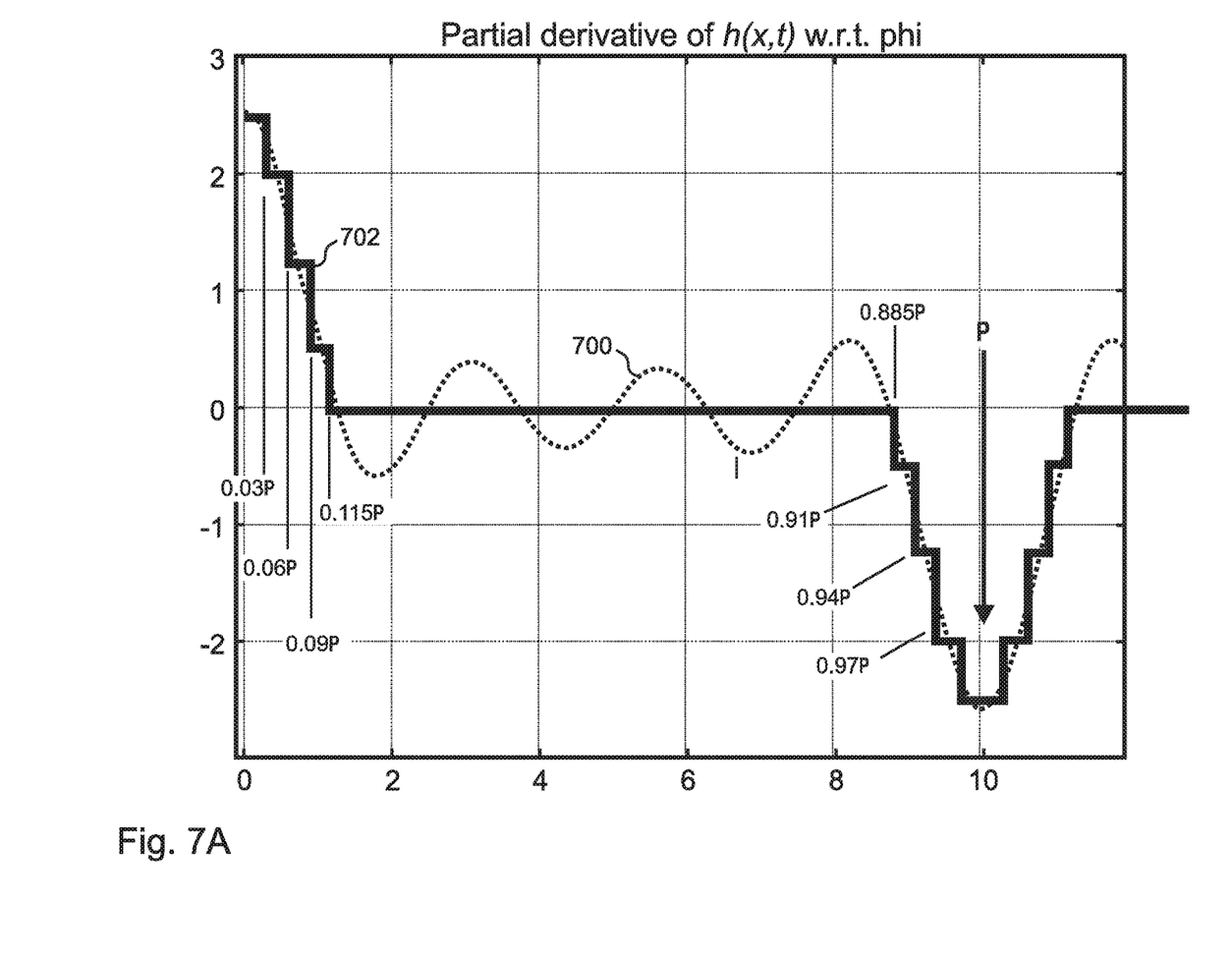
FIG. 7A is a graph that compares a partial derivative with respect to phase of the amplitude modulation model vector of FIG. 6 with a stepwise model of the amplitude modulation model vector.
Figure 7B:
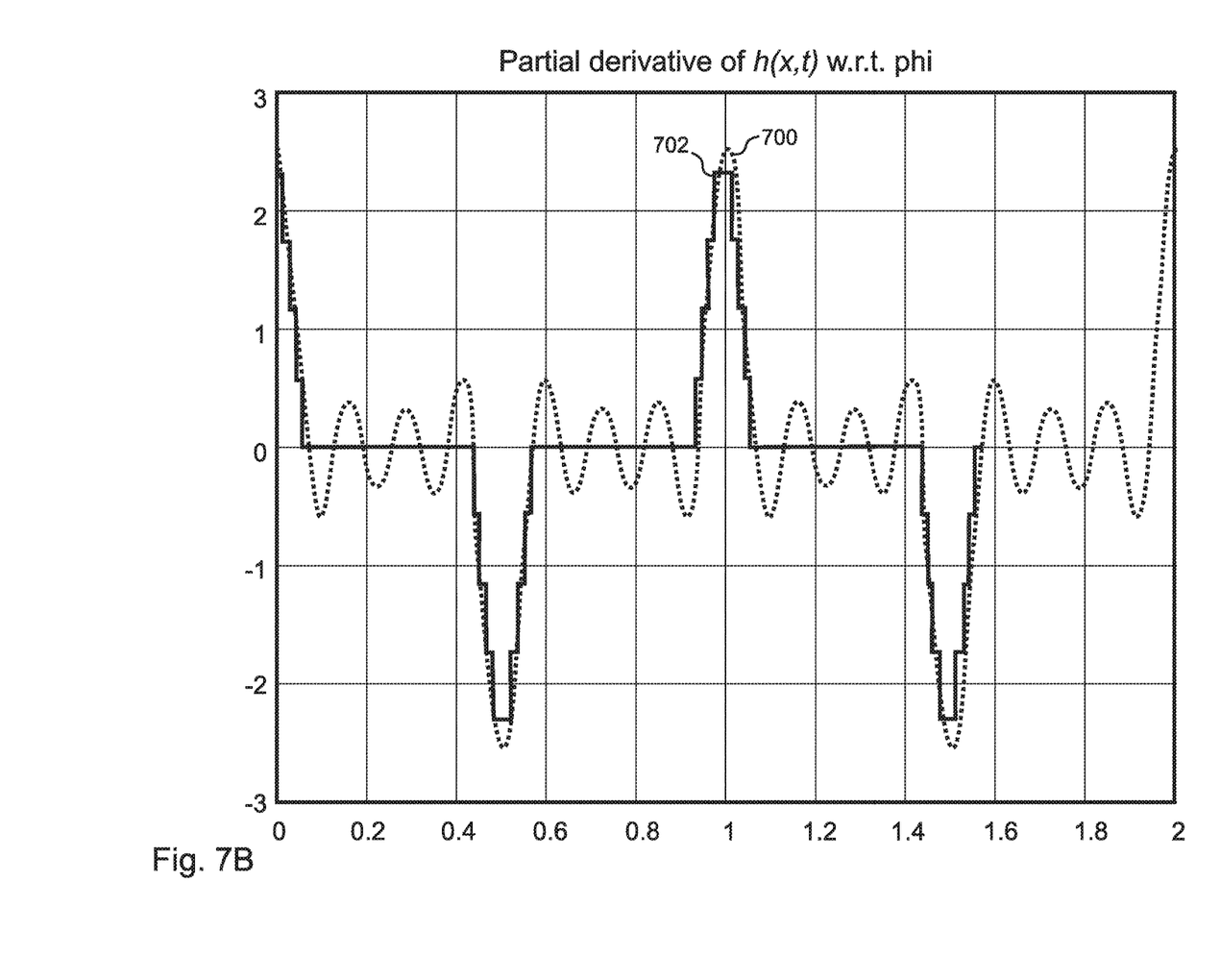
FIG. 7B is a graph that presents the comparison of FIG. 7A over a longer time period.

Furthermore, instead of calculating the partial derivative of the first few Fourier expansion terms for h(x,t) with respect to ϕ according to eqn. 11, a step approximation can be applied instead. FIGS. 7A and 7B compares these calculations of $$\frac{\partial h}{\partial A}$$

obtained according to eqn. 11 using the first four terms of the Fourier expansion 700 of h(x,t) with a step-wise approximation 702.

Figure 8A:
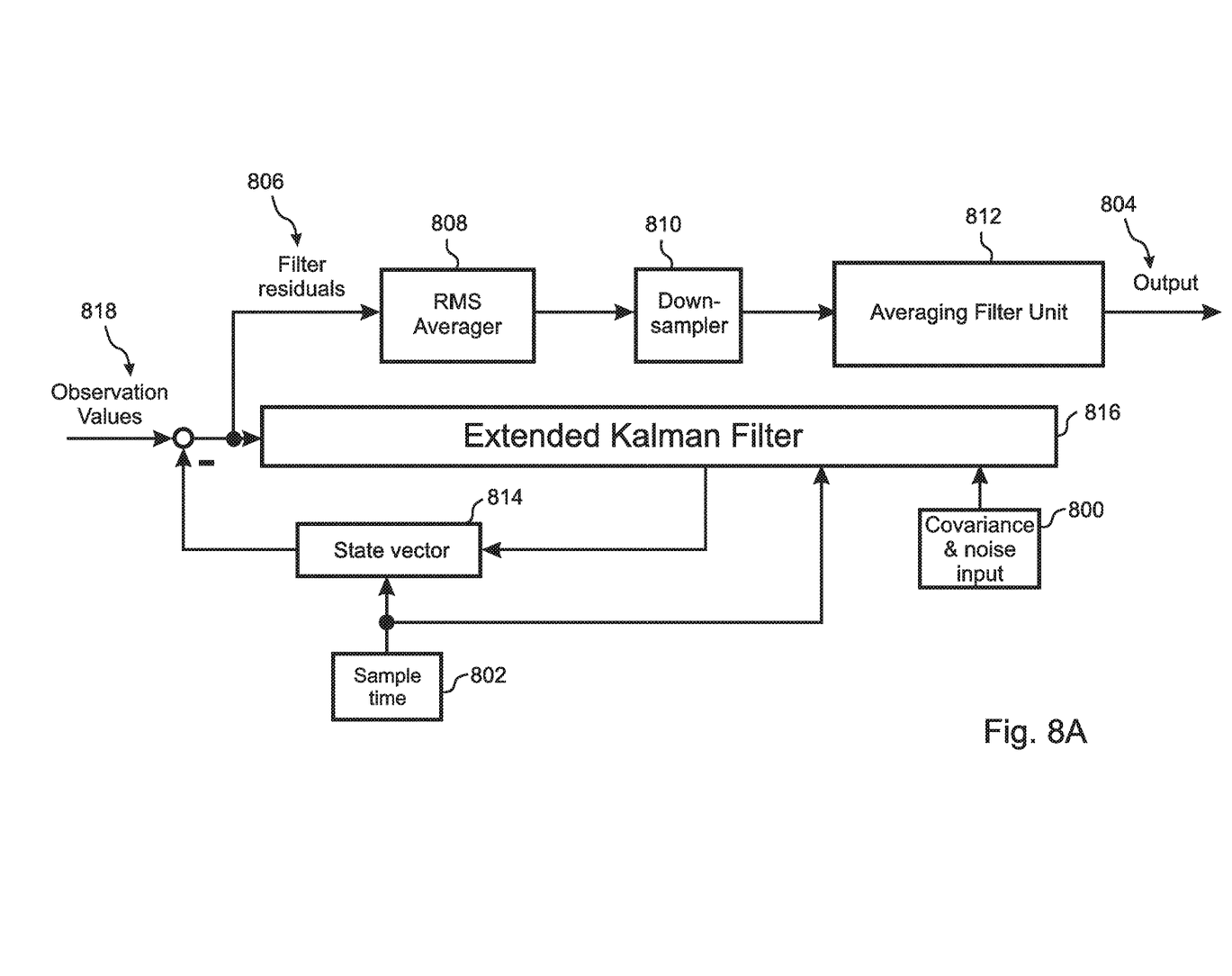
FIG. 8A is a flow diagram that illustrates the application of an extended Kalman filter to a measured signal vector in an embodiment of the present disclosure.
Figure 8B:
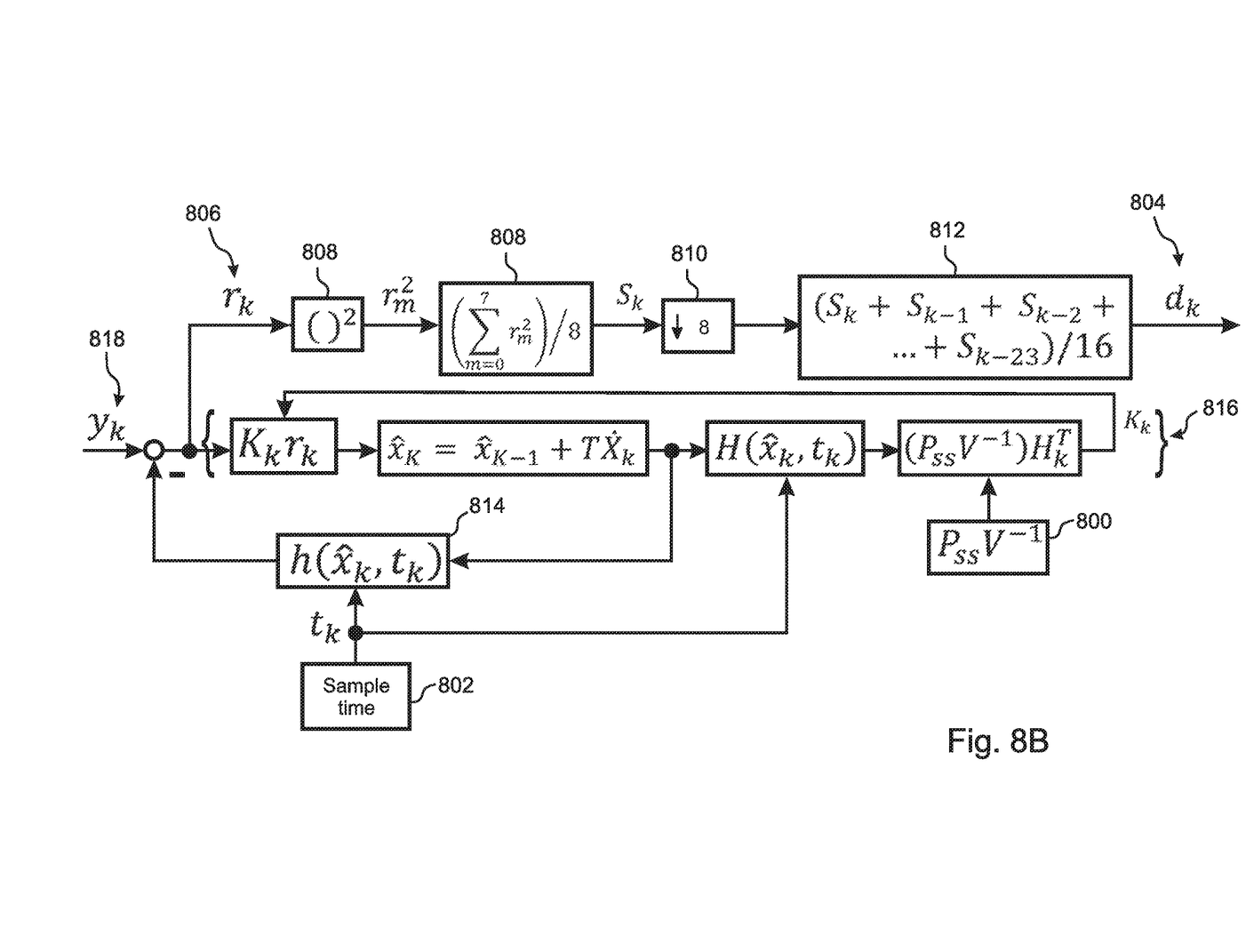
FIG. 8B is a flow diagram similar to FIG. 8A in which applicable mathematical formulae are indicated.

A frequency detecting algorithm that is used in embodiments to detect the square wave modulation frequency of a beacon is illustrated in FIGS. 8A and 8B, where FIG. 8A present a high level functional view, and FIG. 8B presents a more detailed flow diagram with mathematical descriptions of the steps. In the illustrated embodiment, the covariance matrix is a assumed to be a time-invariant, "steady state" covariance matrix $P_{SS}$ This approximation is applied in embodiments such as FIG. 8 because it avoids computation of the covariance matrix during application of the EKF 816, which would otherwise consume significant computational resources. In other embodiments where this approximation does not provide adequate performance, the complete EKF 816 is applied with a time varying covariance P that is derived in accordance with equation (12).

Accordingly, in the example of FIGS. 8A and 8B the block $P_{SS}V^{-1}$ 800 is a constant, 2×2 matrix. Note that the execution count sample index is provided at the sample time block 802. The output samples $d_K$ 804 are computed by processing the filter residuals $r_k$ 806 that are obtained by subtracting the values 814 predicted by the extended Kalman filter 816 from the observation values 818. These residuals 806 are processed to provide a measure of the magnitude of the residual stream, which will be small if the beacon modulation frequency matches the frequency to which the filter is "tuned." The residual stream 806 is squared and averaged in groups of 8 808 and down-sampled by a factor of 8 810 to reduce the sample frequency and lessen processing demands. This down-sampled signal is passed into an averaging filter 812 that sums the previous 24 samples using a moving summing window. Division by 16 rather than 24 is accomplished in embodiments by shifting by 4 bits, rather than through a multiplication.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A method of determining if a candidate laser signal received by a laser-com receiving system is a valid laser communication (laser-com) signal, the method comprising:
    reviewing a scene of interest and identifying therein a light source that is a candidate laser signal;
    directing the candidate laser signal onto a sensor;
    converting the candidate laser signal into a measured vector y(x,t) which is a sum of a state vector of the laser-com receiving system and an observation noise vector v(t);
    detecting whether the candidate laser signal includes a component that is amplitude modulated according to an expected amplitude modulation pattern h(x,t) that is characteristic of a valid laser-com signal, said detecting including application of an Extended Kalman Filter (EKF) to y(x,t); and
    determining that the candidate laser signal is a valid laser-com signal if it includes a component that is amplitude modulated according to the expected amplitude modulation pattern;
    wherein application of the EKF to y(x,t) includes applying a plurality of EKF's to y(x,t), each of the EKF's being tuned to detect a different expected amplitude modulation pattern.

2. The method of claim 1, wherein the sensor is a focal plane array (FPA) comprising a plurality of light sensors.

3. The method of claim 2, wherein the method further comprises using the FPA to track the candidate laser signal and thereby compensate for jitter of the candidate laser signal.

4. The method of claim 1, wherein the valid laser-com signal comprises a signal component and a beacon component that differ from each other in wavelength, said components being overlapping and parallel.

5. The method of claim 4, further comprising separating candidate beacon light having the beacon component wavelength from the candidate laser signal, and directing only the candidate beacon light onto the sensor.

6. The method of claim 1, wherein the expected modulation pattern h(x,t) is a square wave modulation having an expected square wave modulation frequency.

7. The method of claim 6, wherein application of the EKF to y(x,t) includes applying a plurality of EKF's to y(x,t), each of the EKF's being tuned to detect a different square wave modulation frequency.

8. The method of claim 1, wherein applying the EKF to y(x,t) includes calculating partial derivatives of h(x,t) with respect to amplitude and phase.

9. The method of claim 8, wherein calculating the partial derivative of h(x,t) with respect to phase includes approximating h(x,t) by a truncated Fourier expansion of h(x,t), and calculating a partial derivative with respect to phase thereof.

10. The method of claim 8, wherein calculating the partial derivative of h(x,t) with respect to phase includes determining a step-wise approximation of the partial derivative of h(x,t) with respect to phase.

11. The method of claim 1, wherein applying the EKF filter to y(x,t) includes assuming that h(x,t) includes a time-invariant, steady state covariance matrix.

12. An apparatus for determining if a candidate laser signal received by a laser-corn receiving system is a valid laser communication (laser-corn) signal, the apparatus comprising:
   a sensor configured to receive the candidate laser signal and generate therefrom a measured state vector y(x,t) which is a sum of a state vector of the laser-corn receiving system and an observation noise vector v(t);
   a beam directing device configured to:
      review a scene of interest;
      identify therein a light source that is a candidate laser signal; and
      direct the candidate laser signal onto the sensor; and
   a controller cooperative with the sensor and the beam directing device, the controller being configured to:
      cause the beam directing device to direct the candidate laser signal onto the sensor;
      receive y(x,t) from the sensor;
      detect whether y(x,t) includes a beacon component that is amplitude modulated according to an expected amplitude modulation pattern h(x,t), said detecting including application of an Extended Kalman Filter (EKF) to y(x,t); and
      determine that the candidate laser signal is a valid laser-com signal if y(x,t) includes the beacon component;
      wherein application of the EKF to y(x,t) includes applying a plurality of EKF's to y(x,t), each of the EKF's being tuned to detect a different expected amplitude modulation pattern.

13. The apparatus of claim 12, wherein the controller is further configured, upon determining that the candidate laser signal is a valid laser-com signal, cause the beam directing device to align the laser-com signal with a laser data receiver, so that the laser data receiver is able to receive wireless data from the laser-com signal.

14. The apparatus of claim 12, further comprising a beam dividing device configured to separate overlapping and parallel laser beam components of differing wavelengths included in the signal of interest, one of said components being a beacon component.

15. The apparatus of claim 14, wherein the beam dividing device comprises at least one of a diffraction grating, a prism, a beam splitter, and a bandpass filter.

16. The apparatus of claim 14, wherein the beam dividing device is configured to direct the beacon component onto the sensor, while directing at least one other of the components onto the laser data receiver.

* * * * *